US012632276B2

(12) United States Patent
Ajila et al.

(10) Patent No.:    US 12,632,276 B2
(45) Date of Patent:       May 19, 2026

(54) COORDINATED HOOKING MECHANISM FOR CHECKPOINTING VIRTUAL MACHINES

(71) Applicant: International Business Machines Corporation, Armonk, NY (US)

(72) Inventors: Oluwatobi Ajila, Ottawa (CA); Vijay Sundaresan, North York (CA); Thomas J. Watson, Pflugerville, TX (US); Daniel Heidinga, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 17/821,815

(22) Filed: Aug. 24, 2022

(65) Prior Publication Data

US 2024/0069944 A1     Feb. 29, 2024

(51) Int. Cl.
*G06F 9/455*          (2018.01)
*G06F 9/30*           (2018.01)
*G06F 9/4401*         (2018.01)

(52) U.S. Cl.
CPC ...... *G06F 9/45558* (2013.01); *G06F 9/30189* (2013.01); *G06F 9/4418* (2013.01); *G06F 2009/45575* (2013.01)

(58) Field of Classification Search
CPC ............. G06F 9/45558; G06F 9/30189; G06F 9/4418; G06F 2009/45575
See application file for complete search history.

(56) References Cited

U.S. PATENT DOCUMENTS

| | | | |
|---|---|---|---|
| 10,592,346 B1 | 3/2020 | Backensto et al. | |
| 11,138,035 B1 * | 10/2021 | Parulkar | ............. G06F 9/45558 |
| 2008/0216089 A1 | 9/2008 | Jia et al. | |
| 2009/0228889 A1 * | 9/2009 | Yoshida | ................. G06F 9/485 |
| | | | 718/102 |
| 2011/0179311 A1 * | 7/2011 | Nachimuthu | ....... G06F 11/3676 |
| | | | 714/E11.144 |
| 2012/0066555 A1 * | 3/2012 | Ganesh | ............... G06F 11/0715 |
| | | | 714/49 |
| 2020/0184069 A1 * | 6/2020 | Strawser | ............... G06F 21/552 |

(Continued)

OTHER PUBLICATIONS

Unknown Author ("CRIU", web.archive.org/web/20220511050915/ https://www.criu.org/Main_Page, Web page version retrieved dated May 11, 2022) (hereafter as "CRIU Documentation") (Year: 2022).*

(Continued)

*Primary Examiner* — Lewis A Bullock, Jr.
*Assistant Examiner* — Kevin X Lu
(74) *Attorney, Agent, or Firm* — CANTOR COLBURN LLP; Eric Chesley

(57) ABSTRACT

Aspects of the invention include systems and methods configured to checkpoint an application executing on a virtual machine. Aspects include receiving from a first thread executing on a virtual machine a call to a checkpoint application program interface (API) and suspending, by the virtual machine, execution of all threads other than the first thread. Aspects also includes executing, by the virtual machine, all application checkpoint hooks and executing, by the virtual machine, all virtual machine checkpoint hooks. Aspects further include creating one or more checkpoint image files.

12 Claims, 6 Drawing Sheets

(56) References Cited

U.S. PATENT DOCUMENTS

| | | | |
|---|---|---|---|
| 2022/0091872 A1* | 3/2022 | Huilgol | G06F 9/45558 |
| 2025/0005136 A1* | 1/2025 | Shamis | G06F 9/4856 |

OTHER PUBLICATIONS

Michael Bien ("CRaC—Coordinated Restore at Checkpoint", mbien. dev/blog/tags/criu, Aug. 11, 2021). (Year: 2021).*

D. Heidinga, "Everyone wants fast startup: introducing JVM snapshot+ restore." Eclipse. Nov. 2, 2020; 6 pages.

J. Cao et al., "Checkpointing as a Service in Heterogeneous Cloud Environments," @ccs.neu.edu. May 7, 2015; 20 pages.

J. Hursey, "Coordinated Checkpoint/Restart Process Fault Tolerance for MPI Applications On HPC Systems." Department of Computer Science Indiana University, Jul. 2010; 201 pages.

K. Arya, "User-Space Process Virtualization in the Context of Checkpoint-Restart and Virtual Machines." Northeastern University, Aug. 2014; 200 pages.

No Author, "Java Thread Primitive Deprecation", https://cr.openjdk. org/~iris/se/12/latestSpec/api/java.base/java/ lang/doc-files/ threadPrimitiveDeprecation.html, 5 pages.

* cited by examiner

Receive call to a checkpoint API from a first thread

402

Suspend all threads other than the first thread

404

Execute all application checkpoint hooks

406

Execute all virtual machine checkpoint hooks

408

Create checkpoint image files

410

400

COORDINATED HOOKING MECHANISM FOR CHECKPOINTING VIRTUAL MACHINES

BACKGROUND

The present invention generally relates to virtual machines, and more specifically, to computer systems, computer-implemented methods, and computer program products to a coordinated checkpoint hooking mechanism for use in checkpoint and restore operations of a virtual machine.

Checkpoint/Restore is a technique where a running application, process or operating system is paused and persisted into storage, before eventually being restored and execution continued. In general, the checkpoint is the phase where the process is paused and persisted into storage and the restore is the phase where the process is loaded from storage and restored. The checkpoint/restore technique is implemented by hypervisors such as a Kernel-based Virtual Machine (KVM), also operating systems such as Linux (through tools such as Checkpoint/Restore In Userspace (CRIU)).

CRIU is a checkpoint/restore tool that enables checkpointing an application in a user space on Linux. The application state (the data structures that compose the state of the application) that is held in the Java heap, JVM components (classmetadata, jit code cache, etc.) as well as OS resources are all stored in checkpointed image files. The image files produced by CR1U can be used to resume a JVM at a later time, and possibly on a different machine.

In general, changes occur in the environment, such as changes in location, date, and time, between the time when an application is checkpointed and when the application is restored. Currently, user intervention/action is needed to account for these environmental changes.

SUMMARY

Embodiments of the present invention are directed to a computer-implemented method for checkpointing an application executing on a virtual machine. A non-limiting example method includes receiving from a first thread executing on a virtual machine a call to a checkpoint application program interface (API) and suspending, by the virtual machine, execution of all threads other than the first thread. The method also includes executing, by the virtual machine, all application checkpoint hooks and executing, by the virtual machine, all virtual machine checkpoint hooks. The method further includes creating one or more checkpoint image files.

Embodiments of the present invention are directed to a computer program product for checkpointing an application executing on a virtual machine comprising a computer readable storage medium having program instructions embodied therewith. The program instructions executable by one or more processors to cause the one or more processors to perform operations. A non-limiting example of the operations include receiving from a first thread executing on a virtual machine a call to a checkpoint application program interface (API) and suspending, by the virtual machine, execution of all threads other than the first thread. The operations also include executing, by the virtual machine, all application checkpoint hooks and executing, by the virtual machine, all virtual machine checkpoint hooks. The operations further include creating one or more checkpoint image files.

Embodiments of the present invention are directed to a computer-implemented method for checkpointing an application in a managed runtime environment of a computing system. A non-limiting example method includes receiving from a first thread executing on a virtual machine a call to a checkpoint application program interface (API) and suspending, by the virtual machine, execution of all threads other than the first thread. The method also includes executing, by the virtual machine, all application checkpoint hooks and executing, by the virtual machine, all virtual machine checkpoint hooks. The method further includes creating one or more checkpoint image files.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

As discussed above, user intervention/action is currently needed to account for changes that occur between a checkpoint operation and a restore operation, such as changes in location, date, and time. Additionally, changes are needed for security purposes such as re-seeding random values, or removing cached state of security components. It is important to preserve the uniqueness of each restored instance of an image as the lack of uniqueness enables attackers to exploit security mechanisms. One or more embodiments of the present invention address one or more of the above-described shortcomings by providing computer-implemented methods, computing systems, and computer program products that include a checkpoint hooking mechanism that can be used to execute selected portions of code as part of the checkpoint and restore operations to ensure a properly functioning application. These selected portions of code are referred to herein as hooks.

In exemplary embodiments, the hooks include application hooks and virtual machine, or managed environment, hooks.

Application hooks are portions of code of an application that are created by an application programmer. In exemplary embodiments, the application hooks are registered with the virtual machine, or managed environment, and are configured to perform compensation tasks that are specific to the application. Virtual machine hooks are portions of code of the virtual machine, or managed environment, that are created and/or implemented by the virtual machine, or managed environment, provider. Accordingly, the virtual machine is configured to provide guarantees to application developers about the state of the virtual machine when the application is restored from a checkpoint. In general, the virtual machine hooks make it easier for an application to be checkpointed and restored correctly and reduce the burden on the programmer by allowing them to focus on the compensation tasks that are unique to their application.

In exemplary embodiments, the application hooks and virtual machine hooks are executed in a coordinated fashion with respect to other code in the application. Failure to execute the hooks in a coordinated fashion may lead to thread race conditions that can result in incorrect application behavior and/or failure to restore a JVM. Coordination is needed between the application hooks and the JVM hooks themselves, but also among the other threads, or portions of code, that may be running at the time. For example, coordination is needed to prevent an application hoot from writing a state to be used for checkpoint/restore only for some other application thread to run and make that state stale in the short window of time between when the hooks run and the process actually gets checkpointed or the application is fully restored.

Figure 1:
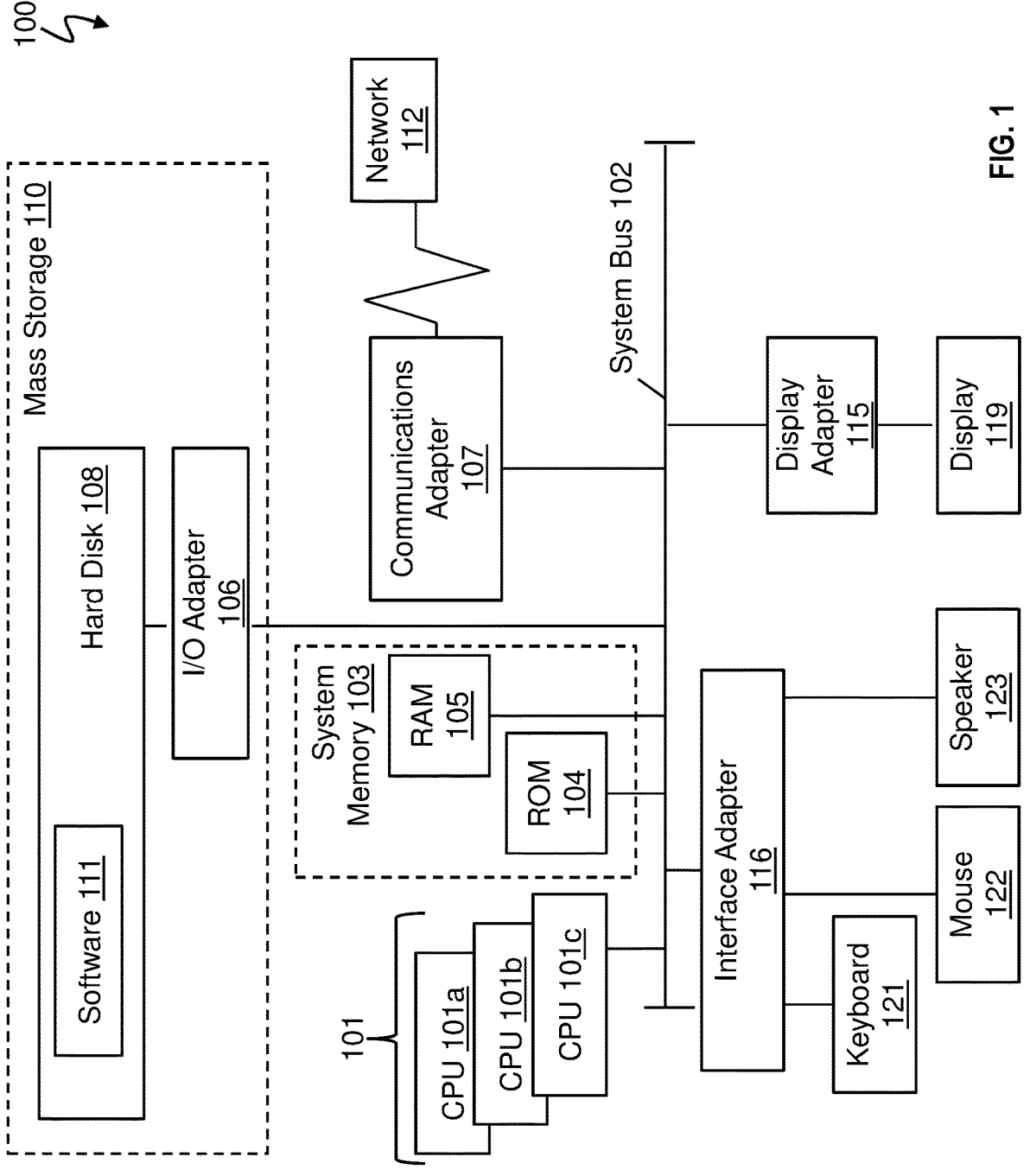
FIG. 1 depicts a block diagram of an example computer system for use in conjunction with one or more embodiments of the present invention.

Referring now to FIG. 1, a computer system 110 is generally shown in accordance with one or more embodiments of the invention. The computer system 110 can be an electronic, computer framework comprising and/or employing any number and combination of computing devices and networks utilizing various communication technologies, as described herein. The computer system 110 can be scalable, extensible, and modular, with the ability to change to different services or reconfigure some features independently of others. The computer system 110 may be, for example, a server, desktop computer, laptop computer, tablet computer, or smartphone. In some examples, computer system 110 may be a cloud computing node (e.g., a node 10 of FIG. 2 below). Computer system 110 may be described in the general context of computer system executable instructions, such as program modules, being executed by a computer system. Generally, program modules may include routines, programs, objects, components, logic, data structures, and so on that perform particular tasks or implement particular abstract data types. Computer system 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 110 has one or more central processing units (CPU(s)) 111a, 111b, 111c, etc., (collectively or generically referred to as processor(s) 111). The processors 111 can be a single-core processor, multi-core processor, computing cluster, or any number of other configurations. The processors 111, also referred to as processing circuits, are coupled via a system bus 112 to a system memory 113 and various other components. The system memory 113 can include a read only memory (ROM) 114 and a random access memory (RAM) 115. The ROM 114 is coupled to the system bus 112 and may include a basic input/output system (BIOS) or its successors like Unified Extensible Firmware Interface (UEFI), which controls certain basic functions of the computer system 110. The RAM is read-write memory coupled to the system bus 112 for use by the processors 111. The system memory 113 provides temporary memory space for operations of said instructions during operation. The system memory 113 can include random access memory (RAM), read only memory, flash memory, or any other suitable memory systems.

The computer system 110 comprises an input/output (I/O) adapter 116 and a communications adapter 117 coupled to the system bus 112. The I/O adapter 116 may be a small computer system interface (SCSI) adapter that communicates with a hard disk 118 and/or any other similar component. The I/O adapter 116 and the hard disk 118 are collectively referred to herein as a mass storage 110.

Software 111 for execution on the computer system 110 may be stored in the mass storage 110. The mass storage 110 is an example of a tangible storage medium readable by the processors 111, where the software 111 is stored as instructions for execution by the processors 111 to cause the computer system 110 to operate, such as is described herein below with respect to the various Figures. Examples of computer program product and the execution of such instruction is discussed herein in more detail. The communications adapter 117 interconnects the system bus 112 with a network 112, which may be an outside network, enabling the computer system 110 to communicate with other such systems. In one embodiment, a portion of the system memory 113 and the mass storage 110 collectively store an operating system, which may be any appropriate operating system to coordinate the functions of the various components shown in FIG. 1.

Additional input/output devices are shown as connected to the system bus 112 via a display adapter 115 and an interface adapter 116. In one embodiment, the adapters 116, 117, 115, and 116 may be connected to one or more I/O buses that are connected to the system bus 112 via an intermediate bus bridge (not shown). A display 119 (e.g., a screen or a display monitor) is connected to the system bus 112 by the display adapter 115, which may include a graphics controller to improve the performance of graphics intensive applications and a video controller. A keyboard 121, a mouse 122, a speaker 123, etc., can be interconnected to the system bus 112 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 110 includes processing capability in the form of the processors 111, and, storage capability including the system memory 113 and the mass storage 110, input means such as the keyboard 121 and the mouse 122, and output capability including the speaker 123 and the display 119.

In some embodiments, the communications adapter 117 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 110 through the network 112. In some examples, an external computing device may be an external webserver or a cloud computing node.

It is to be understood that the block diagram of FIG. 1 is not intended to indicate that the computer system 110 is to include all of the components shown in FIG. 1. Rather, the computer system 110 can include any appropriate fewer or additional components not illustrated in FIG. 1 (e.g., additional memory components, embedded controllers, modules, additional network interfaces, etc.). Further, the embodiments described herein with respect to computer system 110 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
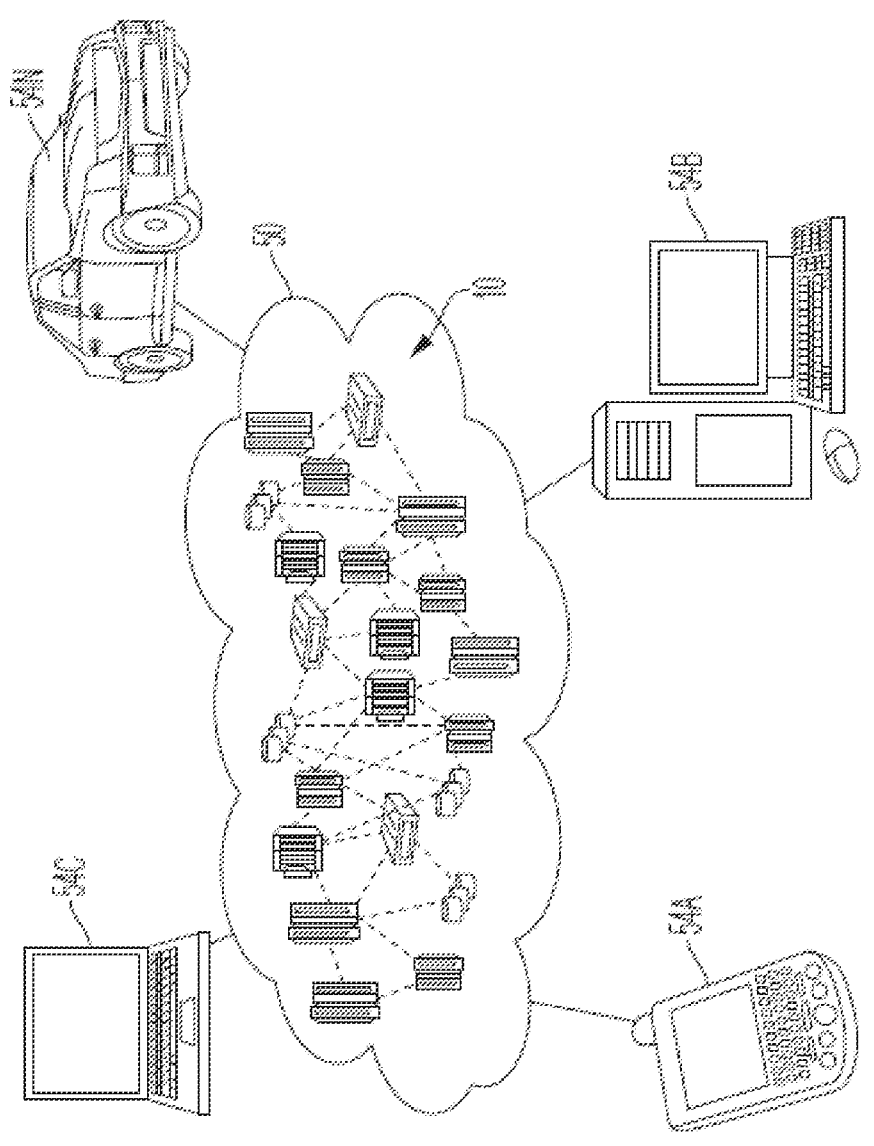
FIG. 2 depicts a cloud computing environment according to one or more embodiments of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
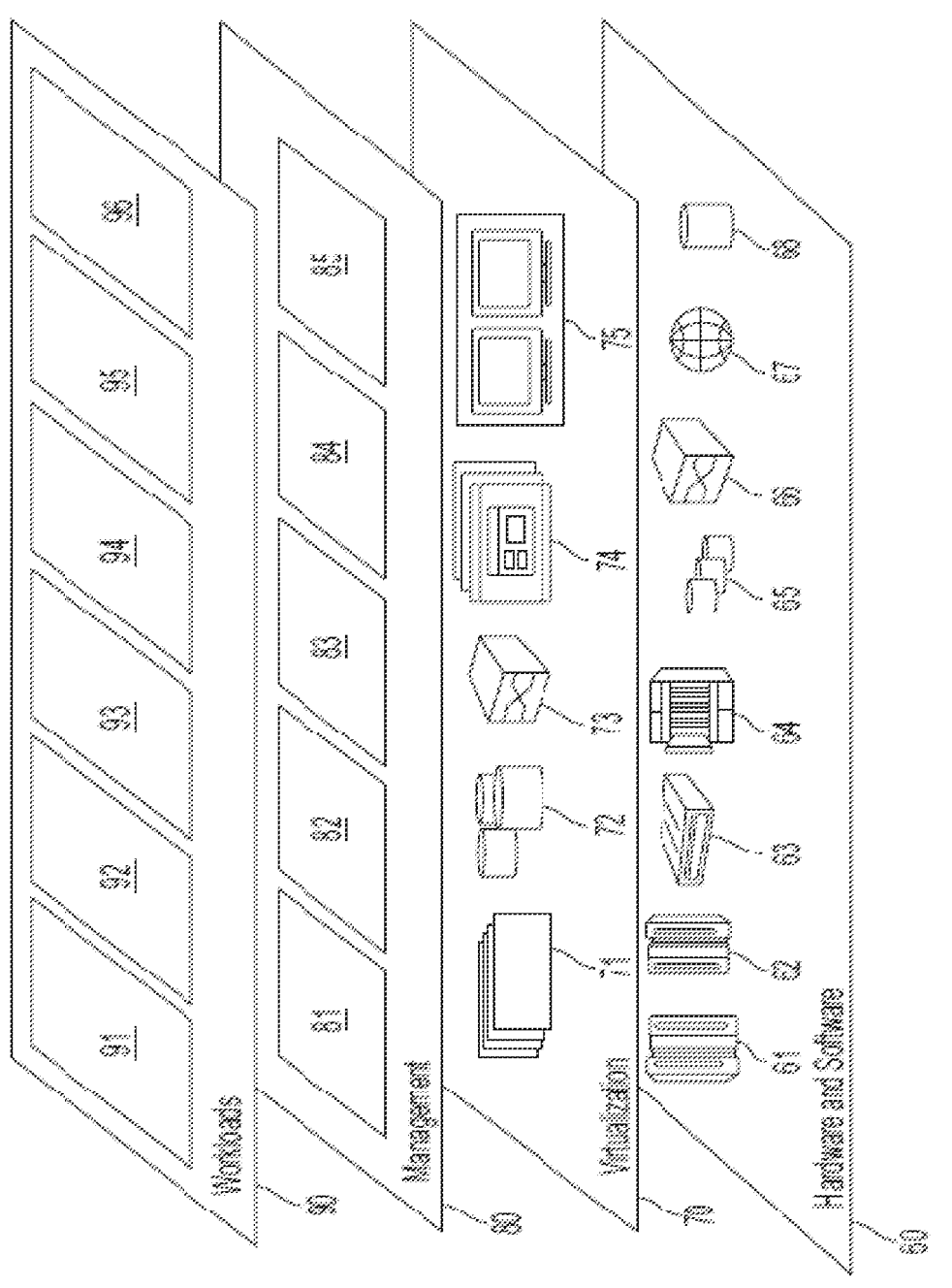
FIG. 3 depicts abstraction model layers according to one or more embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 11 includes hardware and software components. Examples of hardware components include: mainframes 11; RISC (Reduced Instruction Set Computer) architecture based servers 12; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and checkpoint/restore processing 96.

Figure 4:
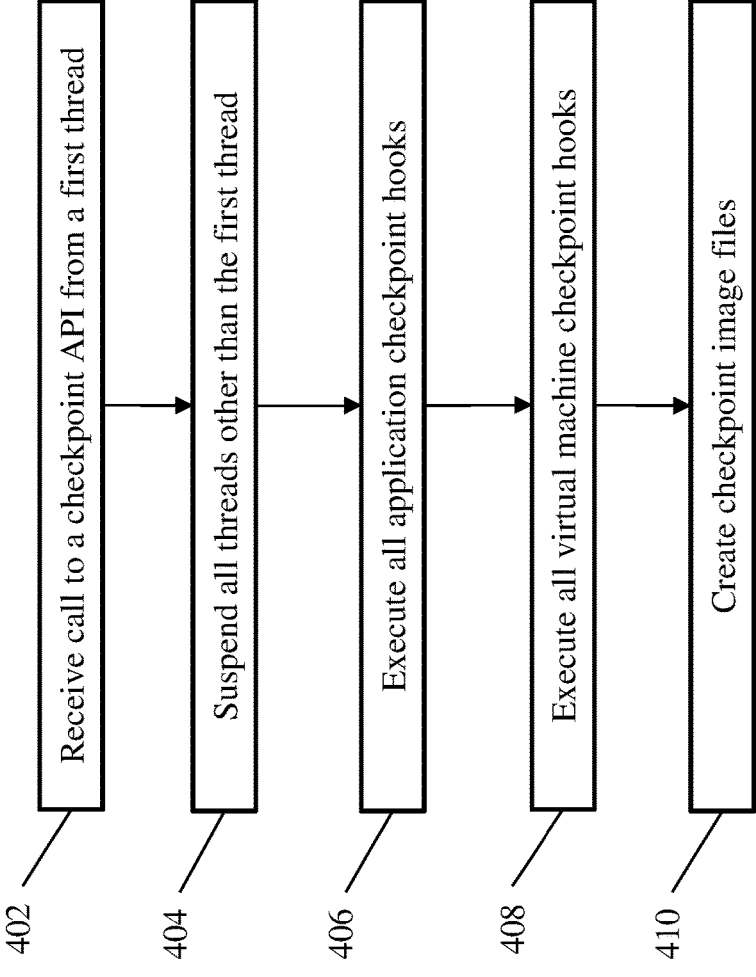
FIG. 4 depicts a flowchart illustrating a method for checkpointing an application executing on a virtual machine in accordance with one or more embodiments of the present invention.

Referring now to FIG. 4, a flowchart illustrating a method 400 for checkpointing an application executing on a virtual machine is shown. In exemplary embodiments, the operations of the method 400 may be performed by system 100, shown in FIG. 1, and/or by one or more nodes 10 of the cloud computing environment 50, shown in FIG. 2.

As shown at block 402, the method 400 includes receiving a call to a checkpoint application program interface (API) from a first thread. In exemplary embodiments, the checkpoint API is part of the virtual machine, or managed environment, as is configured to initiate the checkpoint/restore process. Next, as shown at block 404, the method 400 includes suspending all threads other than the first thread. Once all of the threads, other than the first thread, have been suspended, the method 400 includes executing all of the application checkpoint hooks, as shown at block 406. Next, as shown at block 408, all of the virtual machine checkpoint hooks are executed. The method 400 concludes at block 410 by creating one or more checkpoint image files.

In exemplary embodiments, suspending execution of all threads other than the first thread includes adding a checkpoint halt flag to all threads other than the first thread, wherein the checkpoint halt flag prevents threads from resuming. In one embodiment, suspending execution of all threads other than the first thread includes performing a global suspend operation which suspends the execution of all thread, walking the virtual machine thread list adding add a CHECKPOINT_HALT_FLAG to all application threads, other than the first thread, and performing a global resume operation which resumes operation of all threads that do not have a CHECKPOINT_HALT_FLAG, i.e., only the first thread.

In exemplary embodiments, the method 400 also includes aborting checkpointing the application based on detecting an error executing the application checkpoint hooks. In one embodiment, based on detecting that a timeout is specified during execution of the application checkpoint hook, a new application thread is spawned to run the application checkpoint hooks. Based on determining that the specified timeout is exceeded an exception is thrown and the thread is interrupted.

In exemplary embodiments, when processing application checkpoint hooks, application restore hooks, virtual machine checkpoint hooks, and virtual machine restore hooks, the virtual machine is configured to detect that a terminally blocking operation is about to occur and to throw an exception, rather than executing the terminally blocking operation. In exemplary embodiments, the thrown exception includes an indication of the cause of the exception, i.e., the type of terminally blocking operation that was avoided. In general, the types of terminally blocking operation include contended monitor, terminal operations, and potentially terminal operations.

In exemplary embodiments, a contended monitor error occurs when a thread attempts to acquire a lock that is held by another application thread and causes a deadlock since in the application hook mode only a single application thread can be active. In the case of a contended monitor error, the virtual machine will throw an exception for any contended monitor acquisition, either by bytecode (monitorEnter) or by JNI (MonitorEnter) or java.util.concurrent.locks.Locks.

In exemplary embodiments, a detected terminal operation is an operation that forces the thread to block and requires another thread to enable resumption. Since only a single thread can be run during application hook mode this would cause a deadlock. In one embodiment, a list of known methods that exhibit this behavior will are created and an exception is thrown when one of the methods is called during the application hook mode. Examples of such methods include sun.misc.Unsafe.park( ) and java.lang.Thread.suspend. In exemplary embodiments, a potentially terminal operation is an operation that relies on external resources (sockets, file handles, etc.), these operations may exhibit terminally blocking behavior if there is a failure in the external system. In exemplary embodiments, these cases are addressed by the use of a timeout thread.

Figure 5:
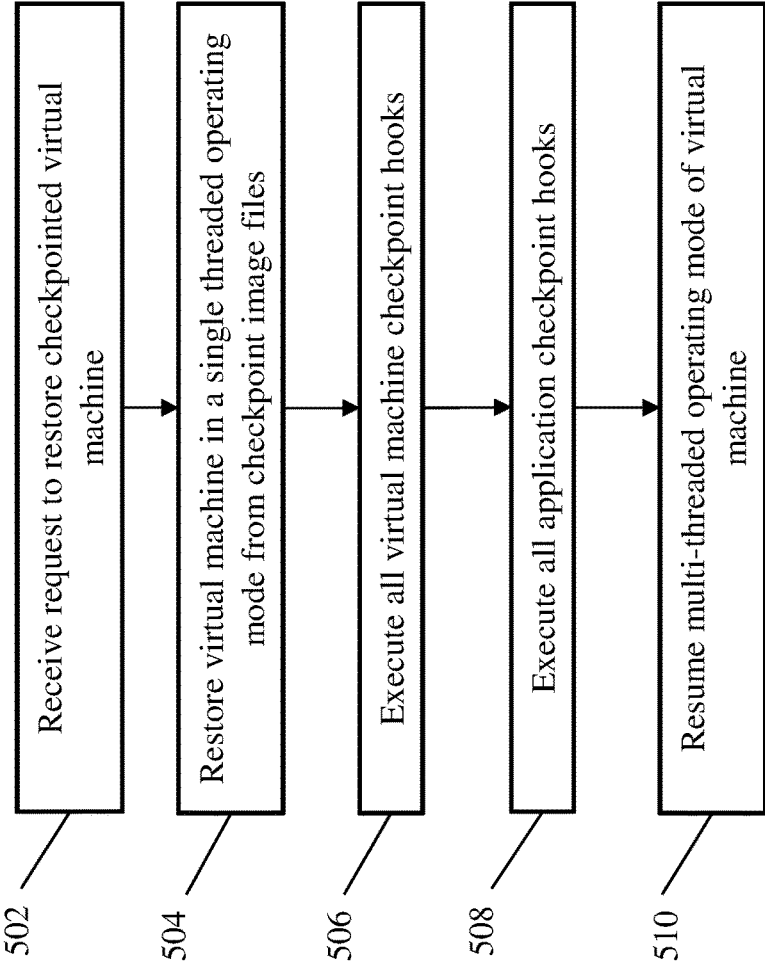
FIG. 5 depicts a flowchart illustrating a method for restoring a checkpointed application executing on a virtual machine in accordance with one or more embodiments of the present invention.

Referring now to FIG. 5, a flowchart illustrating a method 500 for restoring a checkpointed application executing on a virtual machine is shown. In exemplary embodiments, the operations of the method 500 may be performed by system 100, shown in FIG. 1, and/or by one or more nodes 10 of the cloud computing environment 50, shown in FIG. 2.

As shown at block 502, the method 500 includes receiving a request to restore checkpointed virtual machine. Next, as shown at block 504, the method includes restoring the checkpointed virtual machine, in a single threaded operating mode, from checkpoint image files. Once the checkpointed virtual machine has been restored, all of the virtual machine checkpoint hooks are executed, as shown at block 506. In exemplary embodiments, execution of the virtual machine checkpoint hooks performs all of the platform, or managed environment, level compensation tasks that are specified by the virtual machine checkpoint hooks. Next, all application checkpoint hooks are executed, as shown at block 508. In exemplary embodiments, execution of the application checkpoint hooks performs the application specific compensation tasks that are specified by the application checkpoint hooks. Once all of the checkpoint hooks have been executed, the multi-threaded operating mode of virtual machine is resumed, as shown at block 510.

In exemplary embodiments, resuming the multi-threaded operating mode of virtual machine includes removing the checkpoint halt flag from all threads. In one embodiment, resuming the multi-threaded operating mode of virtual machine performing a global suspend operation which suspends the execution of all threads, walking the virtual machine thread list to remove the CHECKPOINT_HALT-_FLAG from all application threads, and performing a global resume operation which resumes operation of all threads. In exemplary embodiments, the method 500 also includes aborting the application based on detecting an error executing one of the virtual machine checkpoint hooks.

Figure 6:
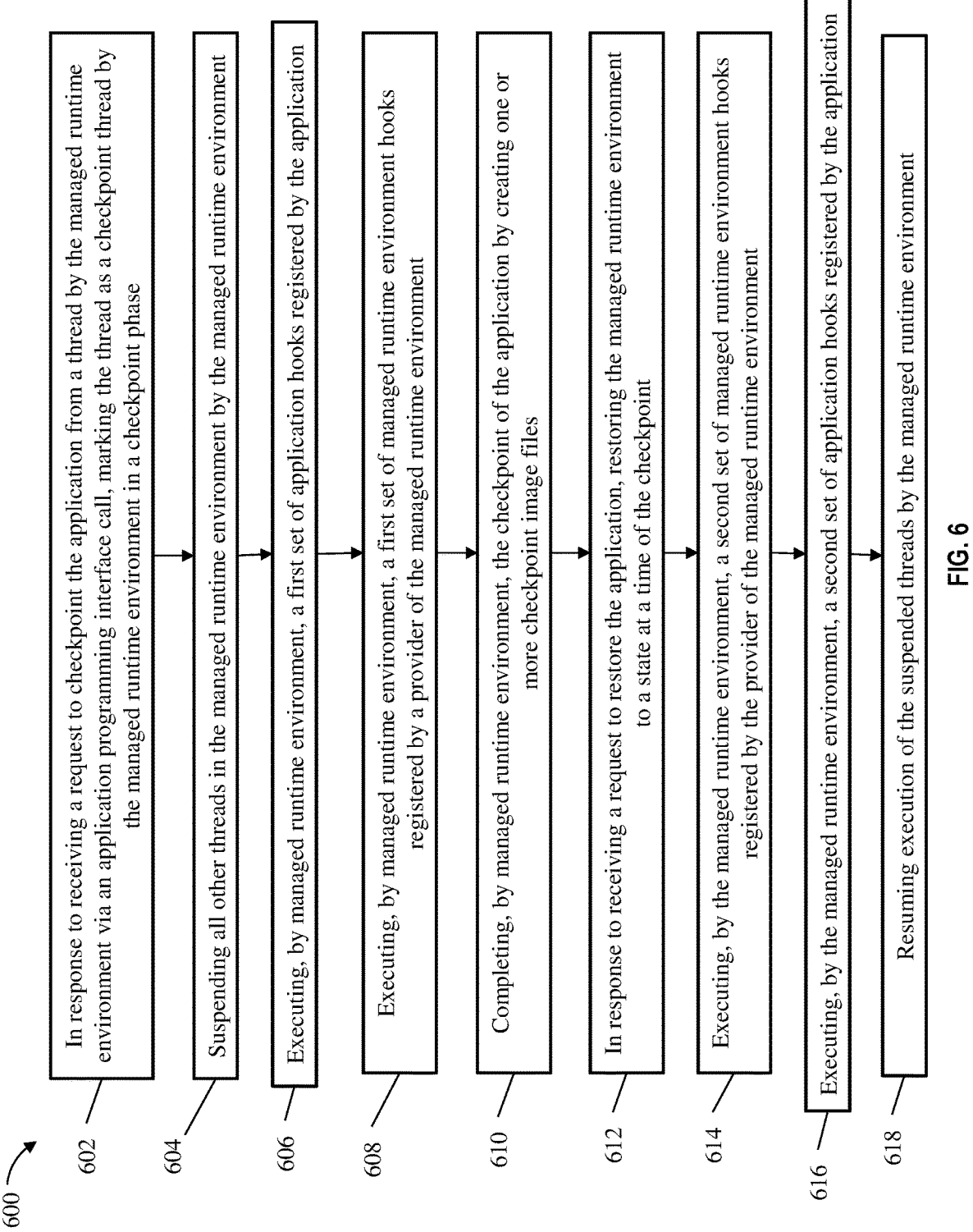
FIG. 6 depicts a flowchart illustrating a method for checkpointing and restoring an application executing on a managed environment in accordance with one or more embodiments of the present invention.

Referring now to FIG. 6, a flowchart illustrating a method 600 for method for checkpointing and restoring an application executing on a managed environment is shown. In exemplary embodiments, the operations of the method 600 may be performed by system 100, shown in FIG. 1, and/or by one or more nodes 10 of the cloud computing environment 50, shown in FIG. 2.

As shown at block 602, the method 600 includes, in response to receiving a request to checkpoint the application from a thread by the managed runtime environment via an application programming interface call, marking the thread as a checkpoint thread by the managed runtime environment in a checkpoint phase. Next, as shown at block 604, the method 600 includes suspending all other threads in the managed runtime environment by the managed runtime environment. The method 600 also includes executing, by managed runtime environment, a first set of application hooks registered by the application, as shown at block 606. Next, as shown at block 608, the method 600 includes executing, by managed runtime environment, a first set of managed runtime environment hooks registered by a provider of the managed runtime environment. The method 600 also includes completing, by managed runtime environment, the checkpoint of the application by creating one or more checkpoint image files, as shown at block 610.

Next, as shown at block 612, the method 600 includes, in response to receiving a request to restore the application, restoring the managed runtime environment to a state at a time of the checkpoint. Next, the method 600 includes executing, by the managed runtime environment, a second set of managed runtime environment hooks registered by the provider of the managed runtime environment, as shown at block 614. Next, as shown at block 616, the method 600 includes executing, by the managed runtime environment, a second set of application hooks registered by the application. The method 600 concludes by resuming execution of the suspended threads by the managed runtime environment, as shown at block 618.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for checkpointing an application executing on a virtual machine, the method comprising:

registering, with the virtual machine, application checkpoint hooks from the application, wherein the application checkpoint hooks are portions of code of the application that are configured to perform application level compensation tasks;

receiving, from a first thread executing on the virtual machine, a call to a checkpoint application program interface (API), wherein the virtual machine having virtual machine checkpoint hooks and virtual machine checkpoint hooks are portions of code of the virtual machine that are configured to perform virtual machine compensation tasks;

suspending, by the virtual machine, execution of all threads other than the first thread, including:

performing a global suspend operation which suspends the execution of all threads;

walking a virtual machine thread list to add a CHECK-POINT_HALT_FLAG to all application threads other than the first thread; and performing a global resume operation which resumes operation of all threads that do not have a CHECK-POINT_HALT_FLAG, thereby placing the virtual machine into a single-threaded operating mode in which only the first thread continues execution;

while in the single-threaded operating mode, executing, by the virtual machine, all application checkpoint hooks;

while in the single-threaded operating mode, executing, by the virtual machine, all virtual machine checkpoint hooks; and creating one or more checkpoint image files in response to executing the application checkpoint hooks and the virtual machine checkpoint hooks.

2. The computer-implemented method of claim 1, further comprising aborting checkpointing the application based on detecting an error executing one or more of the application checkpoint hooks and the virtual machine checkpoint hooks.

3. The computer-implemented method of claim 1, further comprising:

receiving a request to restore the application based on the one or more checkpoint image files;

executing, by the virtual machine, all application restore hooks;

executing, by the virtual machine, all virtual machine restore hooks; and resuming a multi-threaded operating mode by resuming all suspended threads.

4. The computer-implemented method of claim 3, wherein resuming all suspended threads includes performing a global suspend operation which suspends execution of all threads, walking a virtual machine thread list to remove the CHECKPOINTHALTFLAG from all application threads, and performing a global resume operation which resumes operation of all threads.

5. A computer program product for checkpointing an application executing on a virtual machine comprising a computer readable storage medium having program instructions embodied therewith, the program instructions executable by one or more processors to cause the one or more processors to perform operations comprising:

registering, with the virtual machine, application checkpoint hooks from the application, wherein the application checkpoint hooks are portions of code of the application that are configured to perform application level compensation tasks;

receiving, from a first thread executing on the virtual machine, a call to a checkpoint application program interface (API), wherein the virtual machine having virtual machine checkpoint hooks and virtual machine checkpoint hooks are portions of code of the virtual machine that are configured to perform virtual machine compensation tasks;

suspending, by the virtual machine, execution of all threads other than the first thread, including:

performing a global suspend operation which suspends the execution of all threads;

walking a virtual machine thread list to add a CHECK-POINT_HALT_FLAG to all application threads other than the first thread; and performing a global resume operation which resumes operation of all threads that do not have a CHECKPOINTHALTFLAG, thereby placing the virtual machine into a single-threaded operating mode in which only the first thread continues execution;

while in the single-threaded operating mode, executing, by the virtual machine, all application checkpoint hooks;

while in the single-threaded operating mode, executing, by the virtual machine, all virtual machine checkpoint hooks; and creating one or more checkpoint image files in response to executing the application checkpoint hooks and the virtual machine checkpoint hooks.

6. The computer program product of claim 5, wherein the operations further comprise aborting checkpointing the application based on detecting an error executing one or more of the application checkpoint hooks and the virtual machine checkpoint hooks.

7. The computer program product of claim 5, wherein the operations further comprise:

receiving a request to restore the application based on the one or more checkpoint image files;

executing, by the virtual machine, all application restore hooks;

executing, by the virtual machine, all virtual machine restore hooks; and resuming a multi-threaded operating mode by resuming all suspended threads.

8. The computer program product of claim 7, wherein resuming the multi-threaded operating mode includes performing a global suspend operation which suspends execution of all threads, walking a virtual machine thread list to remove the CHECKPOINTHALTFLAG from all application threads, and performing a global resume operation which resumes operation of all threads.

9. A computer-implemented method for a-checkpointing an application in a managed runtime environment of a computing system, the computer-implemented process comprising:

registering, with the managed runtime environment, application checkpoint hooks from the application, wherein the application checkpoint hooks are portions of the code of the application that are configured to perform application level compensation tasks;

receiving, from a first thread executing on the managed runtime environment, a call to checkpoint application programming interface (API), wherein the managed runtime environment having a first set of managed runtime environment checkpoint hooks registered by a provider of the managed runtime environment and the first managed runtime environment checkpoint hooks are portions of code of the managed runtime environment that are configured to perform virtual machine compensation tasks;

suspending, by the managed runtime environment, execution of all threads other than the first thread, including:

performing a global suspend operation which suspends the execution of all threads, walking a virtual machine thread list to add a CHECKPOINT_HALT_FLAG to all application threads other than the first thread, and performing a global resume operation which resumes operation of all threads that do not have a CHECKPOINT_HALT_FLAG, thereby placing the managed runtime environment into a single-threaded operating mode in which only the first thread continues execution;

while in the single-threaded operating mode, executing, by the managed runtime environment, all application checkpoint hooks;

while in the single-threaded operating mode, executing, by the managed runtime environment, all managed runtime environment checkpoint hooks; and creating, by the managed runtime environment, one or more checkpoint image files in response to executing the application checkpoint hooks and the managed runtime environment checkpoint hooks.

10. The computer-implemented method of claim 9, further comprising:

in response to receiving a request to restore the application, restoring the managed runtime environment to a state at a time of the checkpoint;

executing, by the managed runtime environment, a set of managed runtime environment restore hooks registered by the provider of the managed runtime environment;

executing, by the managed runtime environment, a set of application restore hooks registered by the application;

resuming a multi-threaded operating mode by resuming execution of the suspended threads by the managed runtime environment; and completing return from the checkpoint application programming interface call.

11. The computer-implemented method of claim 10, wherein the set of application restore hooks are portions of code of the application that are configured to perform application level compensation tasks.

12. The computer-implemented method of claim 10, wherein the set of managed runtime environment restore hooks are portions of code of the managed runtime environment that are configured to perform virtual machine compensation tasks.

* * * * *